(12) United States Patent       (10) Patent No.:     US 9,300,950 B2
    Sun et al.                  (45) Date of Patent:     Mar. 29, 2016

(54) ENTERTAINMENT DISPLAYING SYSTEM AND INTERACTIVE STEREOSCOPIC DISPLAYING METHOD OF THE SAME

(71) Applicant: AU Optronics Corporation, Hsin-Chu (TW)

(72) Inventors: Yi-Lin Sun, Hsin-Chu (TW); Shih-Lun Lai, Hsin-Chu (TW); Yung-Sheng Tsai, Hsin-Chu (TW); Jen-Lang Tung, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 581 days.

(21) Appl. No.: 13/837,760

(22) Filed: Mar. 15, 2013

(65) Prior Publication Data

US 2014/0049620 A1     Feb. 20, 2014

(30) Foreign Application Priority Data

Aug. 20, 2012   (TW) .............................. 101130137 A

(51) Int. Cl.
    *H04N 13/04*    (2006.01)
    *H04N 13/02*    (2006.01)

(52) U.S. Cl.
    CPC ....... *H04N 13/0468* (2013.01); *H04N 13/0278* (2013.01)

(58) Field of Classification Search
    CPC combination set(s) only.
    See application file for complete search history.

(56) References Cited

U.S. PATENT DOCUMENTS

| 5,574,836 | A  | * | 11/1996 | Broemmelsiek | G06F 3/012 345/421 |
| 8,264,477 | B2 |   | 9/2012  | Tomisawa et al. | |
| 2002/0039230 | A1 | * | 4/2002 | Lin | G02B 27/26 359/465 |
| 2005/0122584 | A1 | * | 6/2005 | Ishikawa | G06F 3/0346 359/463 |
| 2009/0189974 | A1 | * | 7/2009 | Deering | G09G 3/02 348/46 |
| 2010/0164910 | A1 | * | 7/2010 | Tomisawa | G02B 27/0093 345/204 |
| 2011/0084983 | A1 | * | 4/2011 | Demaine | A63F 13/10 345/633 |
| 2012/0162214 | A1 | * | 6/2012 | Chavez | G06F 3/012 345/419 |
| 2013/0083009 | A1 | * | 4/2013 | Geisner | A63F 13/02 345/419 |

FOREIGN PATENT DOCUMENTS

| CN | 101986243   | 3/2011 |
| JP | 2005141102 A | 6/2005 |
| JP | 2010015075 A | 1/2010 |

(Continued)

*Primary Examiner* — Christopher S Kelley
*Assistant Examiner* — Asmamaw G Tarko
(74) *Attorney, Agent, or Firm* — WPAT, PC; Justin King

(57) ABSTRACT

An entertainment displaying system for generating interactive displaying effects corresponding to a real object in view of an observation area is disclosed. The entertainment displaying system includes a tracking module, a computing module and a stereoscopic displaying module. The tracking module is used for tracking a relative position relationship between the real object and the observation area. The computing module is configured for generating a stereoscopic virtual object according to the relative position relationship. The stereoscopic displaying module includes a transparent displaying apparatus and an optical-shielding structure. The transparent displaying apparatus is configured for displaying the stereoscopic virtual object. The optical-shielding structure is disposed adjacent to the transparent displaying apparatus and located between the transparent displaying apparatus and the real object. The optical-shielding structure is configured to be switched according to a virtual depth-of-field order between the stereoscopic virtual object and the real object.

18 Claims, 12 Drawing Sheets

(56) References Cited

FOREIGN PATENT DOCUMENTS

| | | |
|---|---|---|
| JP | 2012141502 A | 7/2012 |
| TW | M399335 | 3/2011 |
| TW | M409872 | 8/2011 |
| TW | 201205174 | 2/2012 |
| WO | 2007018111 A1 | 2/2007 |

* cited by examiner

First Sub-Image Frame

Second Sub-Image Frame

Combined Image

First Sub-Image Frame

Second Sub-Image Frame

Combined Image

First Sub-Image Frame

Second Sub-Image Frame

First Sub-Image Frame

Second Sub-Image Frame

ENTERTAINMENT DISPLAYING SYSTEM AND INTERACTIVE STEREOSCOPIC DISPLAYING METHOD OF THE SAME

RELATED APPLICATIONS

This application claims priority to Taiwan Application Serial Number 101130137, filed Aug. 20, 2012, which is herein incorporated by reference.

BACKGROUND

1. Field of Invention

The invention relates to an entertainment displaying system and a displaying method thereof. More particularly, the invention relates to an entertainment displaying system with an interactive effect and a displaying method thereof.

2. Description of Related Art

Recently the digital displaying apparatus with an interactive displaying effect has been widely applied in various fields, such as a digital billboard which can change an advertising content according to a watching perspective of a user, or a gaming machine which can change a game displaying effect according to an action and perspective of a user.

Taking a currently conventional interactive displaying system as an example, FIG. 1 illustrates a schematic view of a conventional interactive displaying system 100. As shown in FIG. 1, the interactive displaying system 100 includes a real object for displaying a content (such as a rotating wheel structure 120) and a transparent displayer 140 for displaying additional information. Substantially, the rotating wheel structure 120 is used as a background, mainly for displaying information of gaming content.

Additionally, the transparent displayer 140 is used as a display foreground and positioned between the rotating wheel structure 120 and a user observation area 200. The transparent displayer 140 can display additional dynamic information.

As such, the transparent displayer 140 (as the foreground) and the real object (i.e., the rotating wheel structure 120) cooperate to display and form two image layers of foreground and background, such that the image of the interactive displaying system 100 become diversified. In the aforesaid examples, the user observation area 200, an object on the rotating wheel structure 120 and a corresponding displaying effect on the transparent displayer 140 (such as a number 122 and an image 142) should be aligned correctly in a direct line to achieve an optimal effect. Referring to FIG. 2, in an actual condition, the observation perspective of a user is being varied. For example, according to different heights or standing positions of the user, the perspective of the user may not fall into the position of an optimal observation area 200a.

Additionally, in the current prior art, the displaying effect generated through the rotating wheel structure 120 and the transparent displayer 140 shown in FIG. 1 is only limited to a combination of two-dimensional content. Furthermore, recently a breakthrough has been gradually achieved in the stereoscopic displaying technology, and applications such as stereoscopic films and stereoscopic televisions have been launched to the market. The stereoscopic displayer can simulate a depth-of-field effect caused by the eye distance when the eyes are watching, by independently presenting a left-eye image and a right-eye image of different viewing perspectives to eyes of a viewer. Therefore, it is an important development issue of the current industry how to integrate the stereoscopic displaying technology to the above-mentioned transparent displayer and further generate a more diversified interactive displaying effect.

SUMMARY the invention discloses an entertainment displaying system and an interactive stereoscopic displaying method. The entertainment displaying system includes a transparent displaying apparatus arranged between a real object and a user observation position. The entertainment displaying system tracks a relative position relationship between the real object and the user observation position, computes a correction angle to generate a stereoscopic virtual object, and displays the stereoscopic virtual object on the transparent displaying apparatus, so as to avoid a problem of inaccurate alignment caused by change of the user observation position. Furthermore, an optical-shielding structure disposed adjacent to the transparent displaying apparatus selectively switch shielding configuration of the optical-shielding structure to simulate an order of depth-of-field between the stereoscopic virtual object and the real object (for example, the stereoscopic virtual object is used as a foreground and the real object is used as the background, or alternatively the real object is used as a foreground and the stereoscopic virtual object is used as the background), so that a virtual position of the stereoscopic virtual object may be disposed before or after the real object, without being limited to the precedence relationship in the actual arrangement.

An aspect of the invention provides an entertainment displaying system which generates interactive displaying effects corresponding to a real object in view of an observation area. The entertainment displaying system includes a tracking module, a computing module and a stereoscopic displaying module. The tracking module is configured for tracking a relative position relationship between the observation area and the real object. The computing module generates at least one stereoscopic virtual object according to the relative position relationship. The stereoscopic displaying module, disposed between the real object and the observation area, includes a transparent displaying apparatus and an optical-shielding structure. The transparent displaying apparatus is configured for displaying the stereoscopic virtual object. The optical-shielding structure is disposed adjacent to the transparent displaying apparatus and located between the transparent displaying apparatus and the real object. The shielding configuration of the optical-shielding structure is switched according to a virtual depth-of-field order between the stereoscopic virtual object and the real object.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 2:
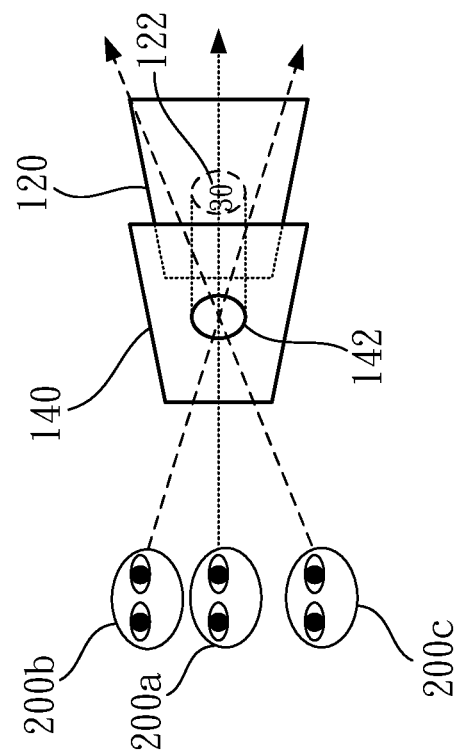
FIG. 2 illustrates a schematic view of a picture content of the interactive displaying system shown in FIG. 1.
Figure 1:
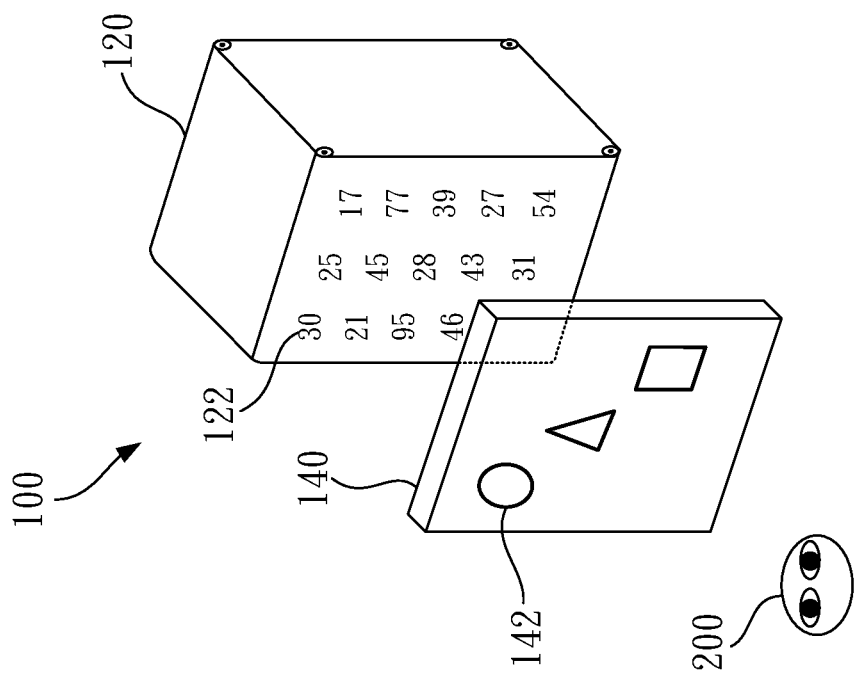
FIG. 1 illustrates a schematic view of a conventional interactive displaying system.
Figure 3:
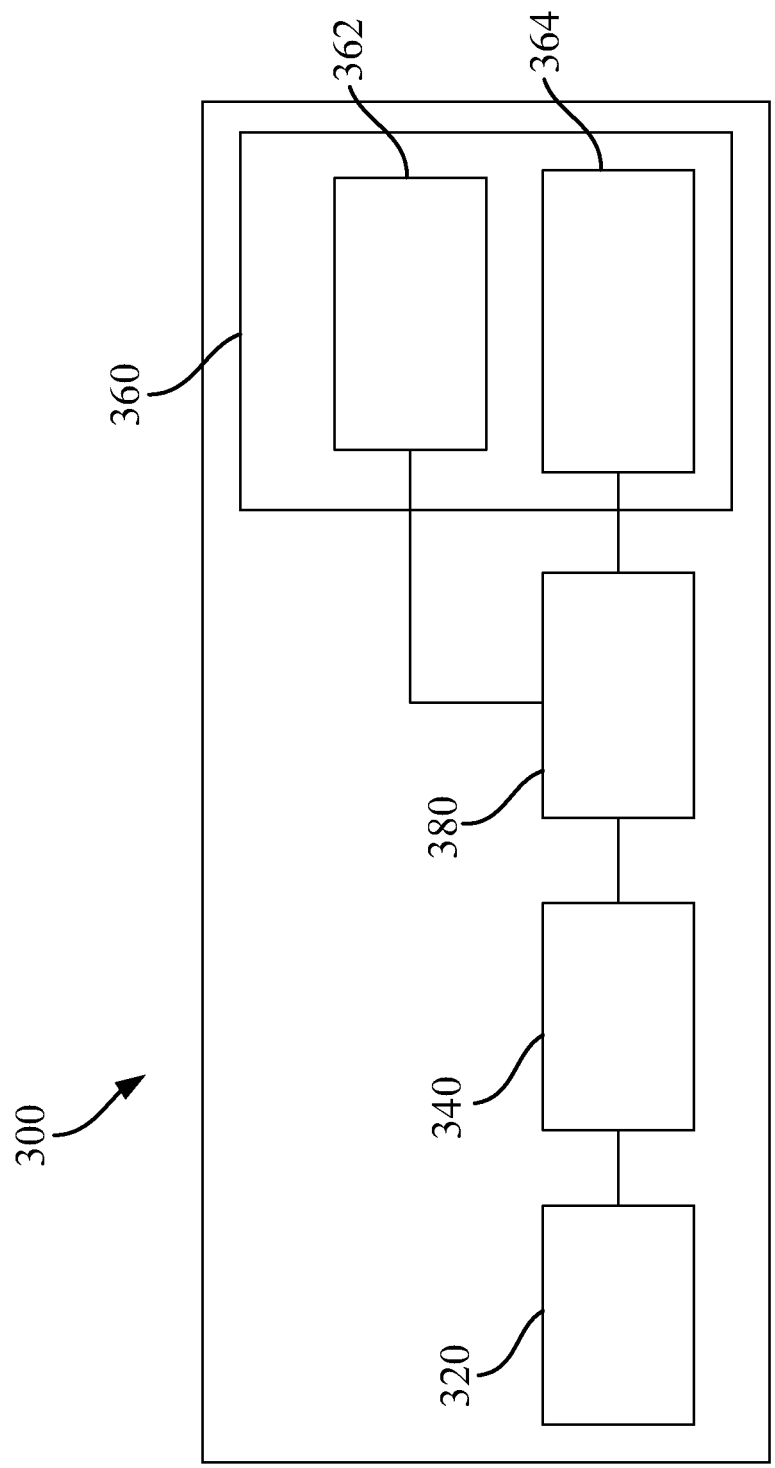
FIG. 3 illustrates a function block diagram of an entertainment displaying system according to an embodiment of the invention.

FIG. 3 illustrates a function block diagram of an entertainment displaying system 300 according to an embodiment of the invention. In the embodiment of FIG. 3, the entertainment displaying system 300 includes a tracking module 320, a computing module 340 and a stereoscopic displaying module 360. The computing module 340 is coupled to the tracking module 320 and the stereoscopic displaying module 360. The entertainment displaying system 300 is configured for cooperating with a real object (such as a commercial product, an advertising object or a gaming tool) to generate an interactive displaying effect to a corresponding observation area of eyes of a user. For example, the entertainment displaying system 300 can be a gaming machine with a stereoscopic displaying module.

Figure 4A:
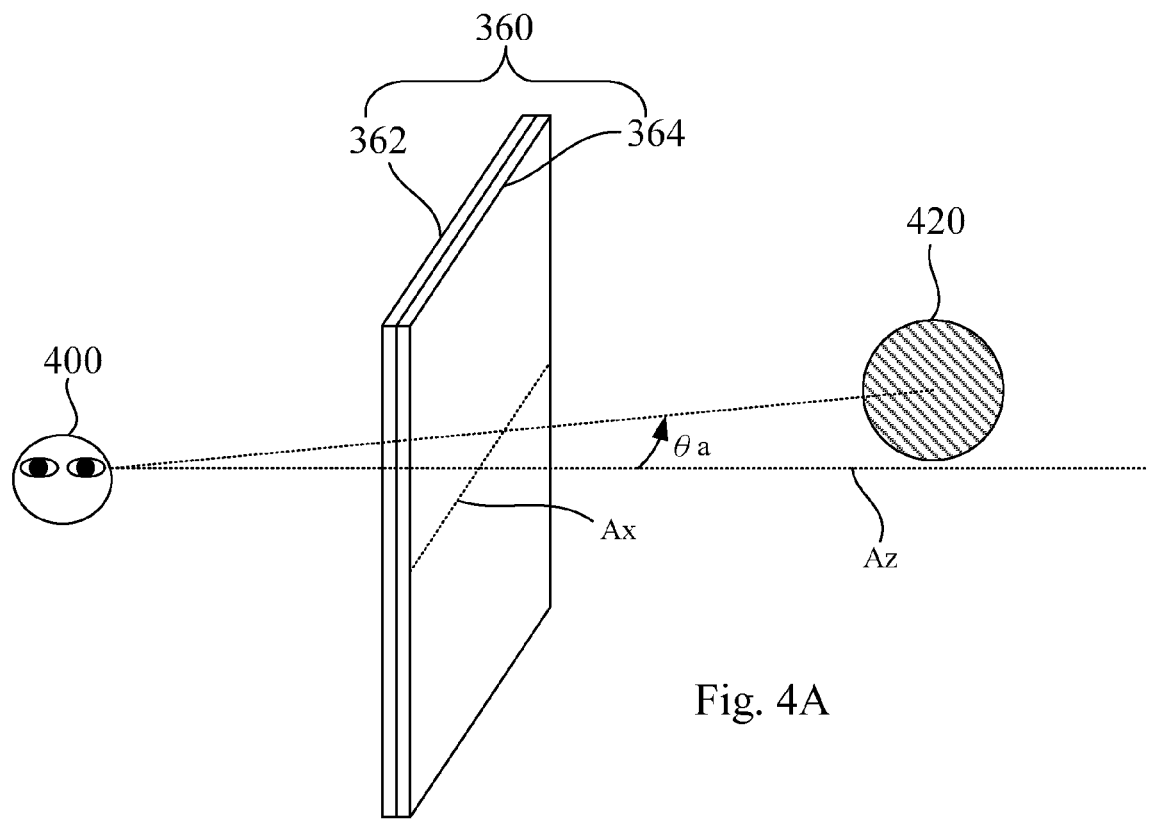
FIG. 4A illustrates a schematic view of a stereoscopic displaying module, an observation area and a real object according to an embodiment of the invention.
Figure 4B:
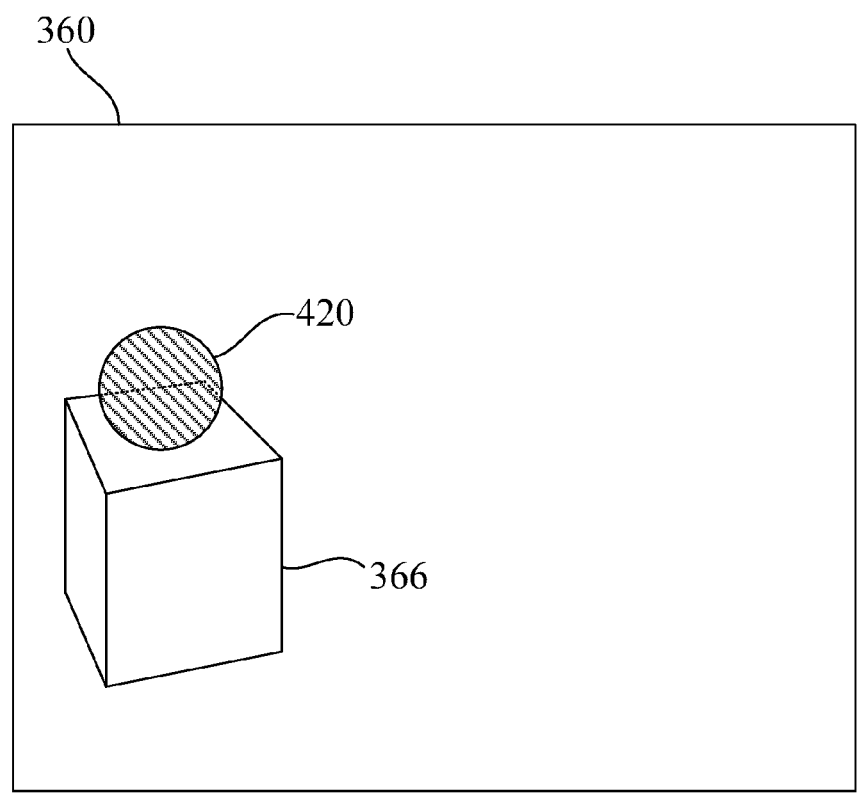
FIG. 4B illustrates a schematic view of the real object of the embodiment of FIG. 4A and a stereoscopic virtual object displayed on the stereoscopic displaying module.

Referring to both of FIGS. 4A and 4B, FIG. 4A illustrates a schematic view of a stereoscopic displaying module 360, an observation area 400 and a real object 420 according to an embodiment of the invention; and FIG. 4B illustrates a schematic view of the real object 420 of the embodiment of FIG. 4A and a stereoscopic virtual object 366 displayed on the stereoscopic displaying module 360. The tracking module 320 is configured for tracking actual coordinates of the observation area 400 and the real object 420 and computes a relative position relationship between the observation area 400 and the real object 420. For example, the observation area 400 can be eyes of the user. For example, the tracking module 320 may be disposed in a position of the entertainment displaying system 300 which does not hinder the user from watching the displayed picture, such as at least one groove at a corner, top and bottom surfaces or side surfaces of the entertainment displaying system 300. The tracking module 320 includes at least one inducing unit (such as photographic lens and infrared tracking apparatus) for acquiring image pictures respectively along directions of the observation area 400 and the real object 420. Then after image processing (for example removing the background, and identifying an object) the position coordinates of the observation area 400 and the real object 420 are obtained and thus the relative position relationship between the observation area 400 and the real object 420 can be computed. The computing module 340 generates the stereoscopic virtual object 366 according to the relative position relationship (as shown in FIG. 4B), and details of generating the stereoscopic virtual object 366 are described in the following paragraphs.

The stereoscopic displaying module 360 disposed between the real object 420 and the observation area 400 includes a transparent displaying apparatus 362 and an optical-shielding structure 364. The transparent displaying apparatus 362 included in the stereoscopic displaying module 360 is configured for displaying the stereoscopic virtual object 366.

The stereoscopic virtual object 366 referred in this embodiment is a visual image configured for cooperating with the real object 420 and is displayed on the transparent displaying apparatus 362 of the stereoscopic displaying module 360. In actual application, the stereoscopic virtual object 366 may be additional gaming information or animation effect which cooperates with the real object 420 for gaming. In this embodiment, for convenience of illustration, the real object 420 is a spherical body, and the stereoscopic virtual object 366 is a cubic object visually positioned underneath the spherical body (the real object 420), although the invention is not limited to the aforesaid exemplary three-dimensional shape.

It should be noted that the shape, appearance and displaying order of the stereoscopic virtual object 366 of the invention is varied dynamically according to the relative position relationship between the observation area 400 and the real object 420. That is, the displaying content (shape, appearance and displaying order) of the stereoscopic virtual object 366 is varied according to a position of the user observation area 400 or a movement of the real object 420, so as to achieve an interactive effect. The following paragraphs further illustrate a generation mechanism of the interactive effect.

Figure 4C:
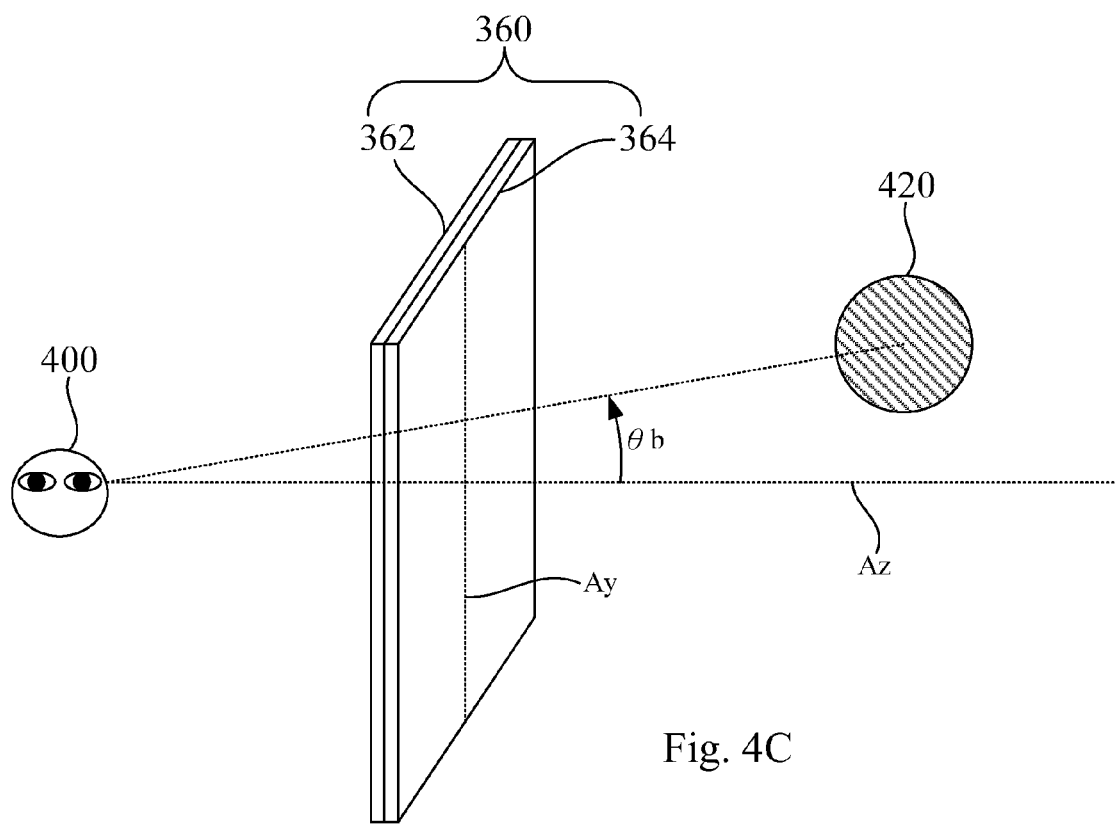
FIG. 4C illustrates a schematic view of a stereoscopic displaying module, an observation area and a real object according to an embodiment of the invention.
Figure 4D:
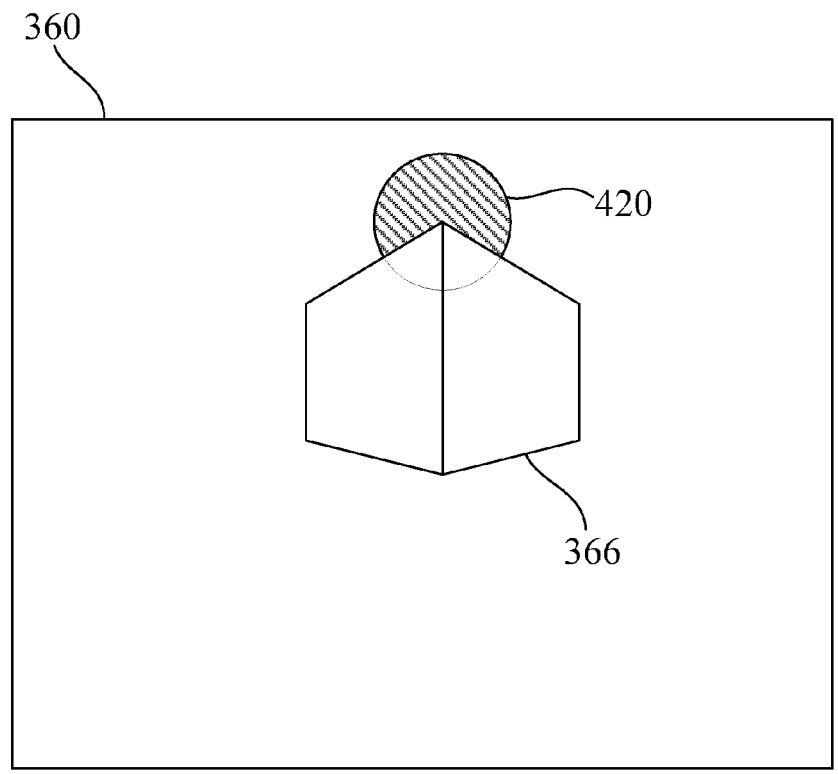
FIG. 4D illustrates a schematic view of the real object of the embodiment of FIG. 4C and a stereoscopic virtual object displayed on the stereoscopic displaying module.
Figure 4E:
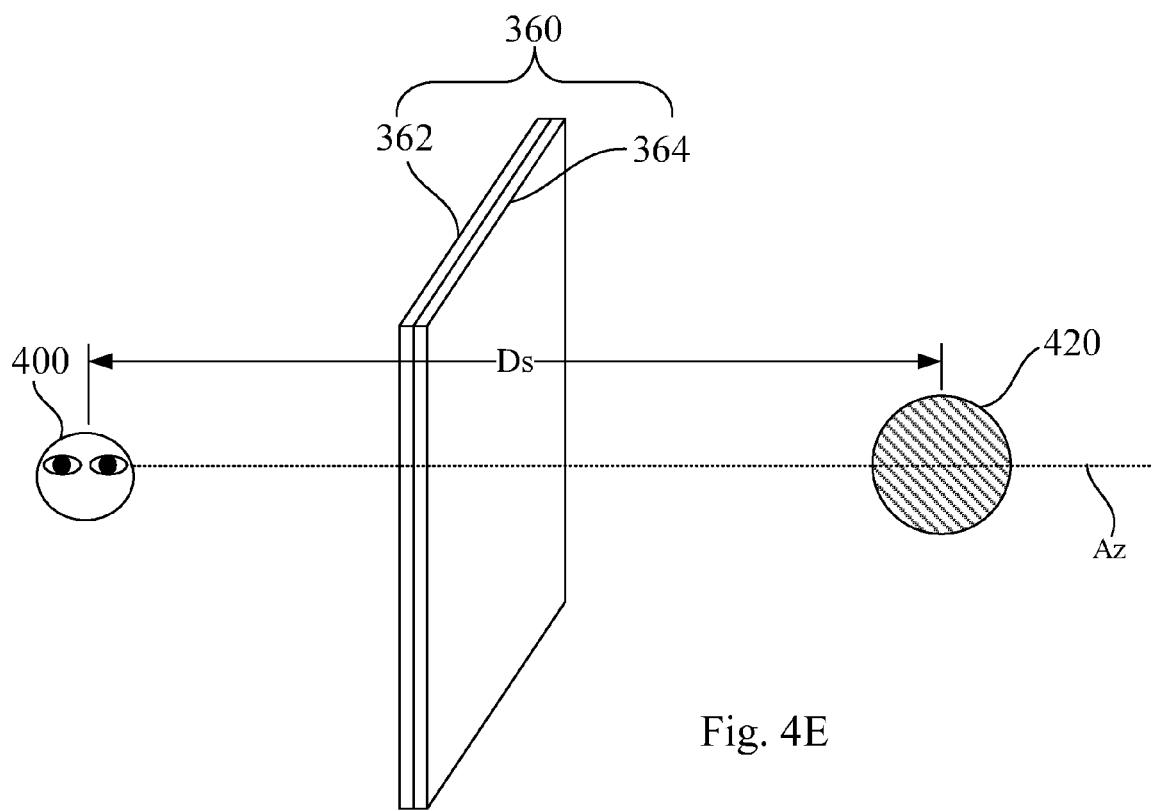
FIG. 4E illustrates a schematic view of a stereoscopic displaying module, an observation area and a real object according to an embodiment of the invention.
Figure 4F:
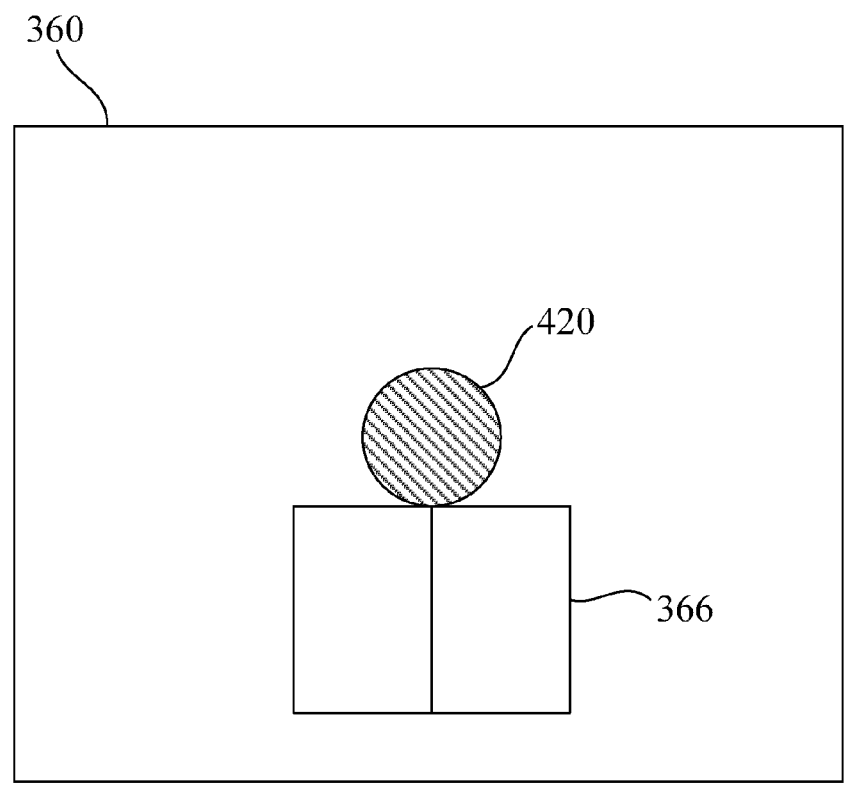
FIG. 4F illustrates a schematic view of the real object of the embodiment of FIG. 4E and a stereoscopic virtual object displayed on the stereoscopic displaying module.
Figure 4G:
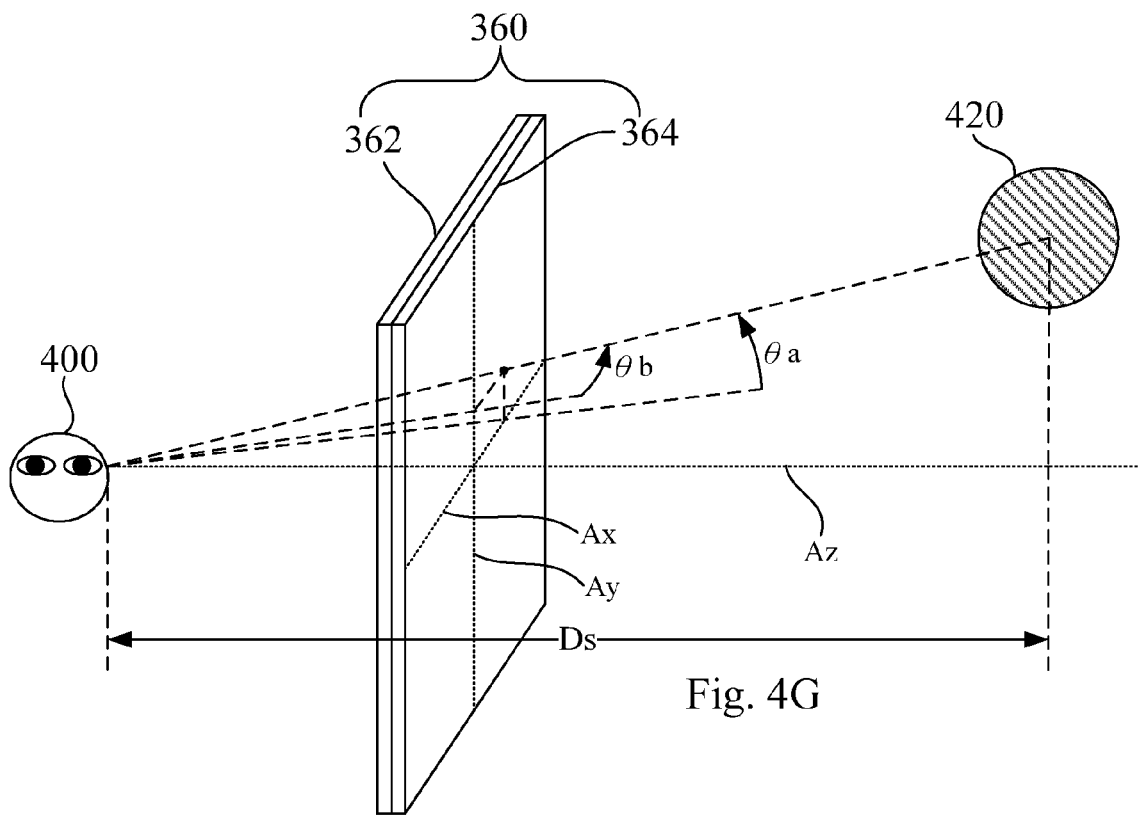
FIG. 4G illustrates a schematic view of a stereoscopic displaying module, an observation area and a real object according to an embodiment of the invention.
Figure 4H:
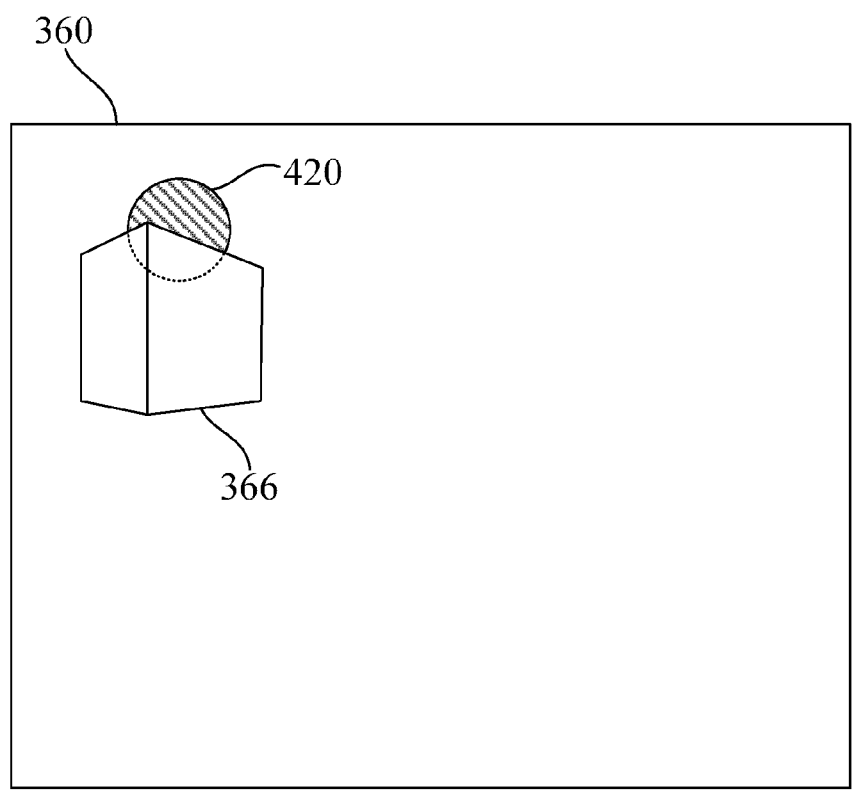
FIG. 4H illustrates a schematic view of the real object of the embodiment of FIG. 4G and a stereoscopic virtual object displayed on the stereoscopic displaying module.

Reference is made to FIGS. 4C, 4D, 4E, 4F, 4G and 4H. Each of FIGS. 4C, 4E and 4G illustrates a schematic view of the relative position relationship between the observation area 400 and the real object 420 according to other embodiments of the invention. FIG. 4D illustrates a schematic view of the real object 420 and the stereoscopic virtual object 366 displayed on the stereoscopic displaying module 360 under the relative position relationship shown in FIG. 4C. FIG. 4F illustrates a schematic view of the real object 420 and the stereoscopic virtual object 366 displayed on the stereoscopic displaying module 360 under the relative position relationship shown in FIG. 4E. FIG. 4H illustrates a schematic view of the real object 420 and the stereoscopic virtual object 366 displayed on the stereoscopic displaying module 360 under the relative position relationship shown in FIG. 4G.

As shown in FIGS. 4A to 4H, the displaying plane of the transparent displaying apparatus 362 has a transverse axis Ax (extending along a horizontal direction) and a longitudinal axis Ay (extending along a vertical direction). Furthermore, a normal line Az is defined by virtually linking the observation area 400 and its projection on the displaying plane of the transparent displaying apparatus 362.

A linking line is defined by virtually linking the observation area 400 and the real object 420. In the embodiment, the relative position relationship between the observation area 400 and the real object 420 includes a first relative angle θa, a second relative angle θb and a relative horizontal distance Ds. The first relative angle θa is the angle of the linking line deviated from the normal line Az toward the transverse axis Ax (as shown in FIG. 4A). The second relative angle θb is the angle of the linking line deviated from the normal line Az towards the longitudinal axis Ay (as shown in FIG. 4C). The relative horizontal distance Ds is the distance between the observation area 400 and to the real object 420 along the normal line Az (as shown in FIG. 4E).

The computing module 340 is configured for regulating a stereoscopic visual effect of the object prototype according to the first relative angle θa and the second relative angle θb. In this embodiment, taking a cubic object as an example of the object prototype, the size of the object prototype (the cubic object) is regulated according to the relative horizontal distance Ds, so as to generate the stereoscopic virtual object 366 (such as the stereoscopic virtual object 366 shown in FIGS. 4B, 4D, 4F and 4H).

FIGS. 4A and 4B are used for illustrating that the relative position relationship between the observation area 400 and the real object 420 is that the visual linking line between the real object 420 and the observation area 400 is deviated towards left along the transverse axis Ax relative to the normal line Az. Therefore, the computing module 340 is configured for regulating the stereoscopic visual effect of the object prototype according to the first relative angle θa and generating the stereoscopic virtual object 366 shown in FIG. 4B. Due to the deviation of the first relative angle θa, in this example the stereoscopic virtual object 366 is viewed by the user through the observation area 400 from a right-to-left perspective, so that for the example of FIG. 4B the user can see a large area of the right-side half surface of the stereoscopic virtual object 366, but only see a small area of the left-side half surface of the stereoscopic virtual object 366.

The examples of FIGS. 4A and 4B are used for illustration, and the relative position relationship between the observation area 400 and the real object 420 is that the visual linking line between the real object 420 and the observation area 400 is deviated upwards along the longitudinal axis Ay relative to the normal line Az. Therefore, the computing module 340 is configured for regulating the stereoscopic visual effect of the object prototype according to the second relative angle θb, so as to generate the stereoscopic virtual object 366 of FIG. 4D. Due to deviation of the second relative angle θb, in this example the user watches the stereoscopic virtual object 366 through the observation area 400 under a bottom-to-top perspective, and thus the stereoscopic virtual object 366 of the example of FIG. 4D extends upwards.

The examples of FIGS. 4E and 4F are used for illustrating the relative horizontal distance Ds between the observation area 400 and the real object 420. The computing module 340 is configured for regulating the size of the object prototype (cubic object) according to the relative horizontal distance Ds, so as to generate the stereoscopic virtual object 366 shown in FIG. 4F. When the relative horizontal distance Ds is longer, the size of the stereoscopic virtual object 366 in FIG. 4F is adjusted to be smaller in the view of users. On the other hand, when the relative horizontal distance Ds is shorter, the size of the stereoscopic virtual object 366 in FIG. 4F is adjusted to be larger in the view of users.

FIGS. 4A and 4F only illustrate schematic views of regulating the object prototype and generating the stereoscopic virtual object 366 when one of the first relative angle θa, second relative angle θb or relative horizontal distance Ds is varied. In actual application, at least two of the three factors, first relative angle θa, second relative angle θb and relative horizontal distance Ds included in the relative position relationship between the observation area 400 and the real object 420 may be varied at the same time. The computing module 340 needs to compute variation of the two factors respectively and generate a corresponding stereoscopic virtual object 366, and regulate the presented direction, angle and coordinate positions of the virtual object 366. Referring to examples of FIGS. 4G and 4H, in the example of FIG. 4G the real object 420 is disposed at a remote position towards top left, and the computing module 340 considers the first relative angle θa, the second relative angle θb and the relative horizontal distance Ds at the same time to generate a corresponding stereoscopic virtual object 366 viewed from a right-bottom-to-top-left perspective and had a small size. The aforesaid FIGS. 4A-4G illustrate the relative position relationship between the observation area 400 and the real object 420 of the invention by way of illustration, but in the actual application it can be inferred that the relative position relationship has various possibilities and is not limited to the above described examples.

In the above examples, the actual displaying positions of the stereoscopic virtual object 366 all fall into the displaying plane of the transparent displaying apparatus 362. The computing module 340 changes the perspective orientation and size of the stereoscopic virtual object 366 according to the relative position relationship to enable the stereoscopic virtual object 366 to visually cooperate with the real object 420, so as to achieve the interactive effect. When the position of the real object 420 is changed, the shape and size of the presented stereoscopic virtual object 366 can be accordingly changed.

Furthermore, the entertainment displaying system 300 may further include a driving module 380 coupled between the computing module 340 and the stereoscopic displaying module 360. The driving module 380 is mainly configured for driving various displaying units on the stereoscopic displaying module 360 to generate a stereoscopic visual image effect according to the stereoscopic virtual object 366 computed by the computing module 340. In the examples shown in FIGS. 4A-4G, the shape of the stereoscopic virtual object 366 is schematically illustrated at a single view point, but due to certain parallax errors of the user eyes during actual application, two sets of images considering parallax errors in viewing should be respectively provided to the left eye and right eye of the user when the stereoscopic virtual object 366 is displayed on the stereoscopic displaying module 360.

Figure 5A:
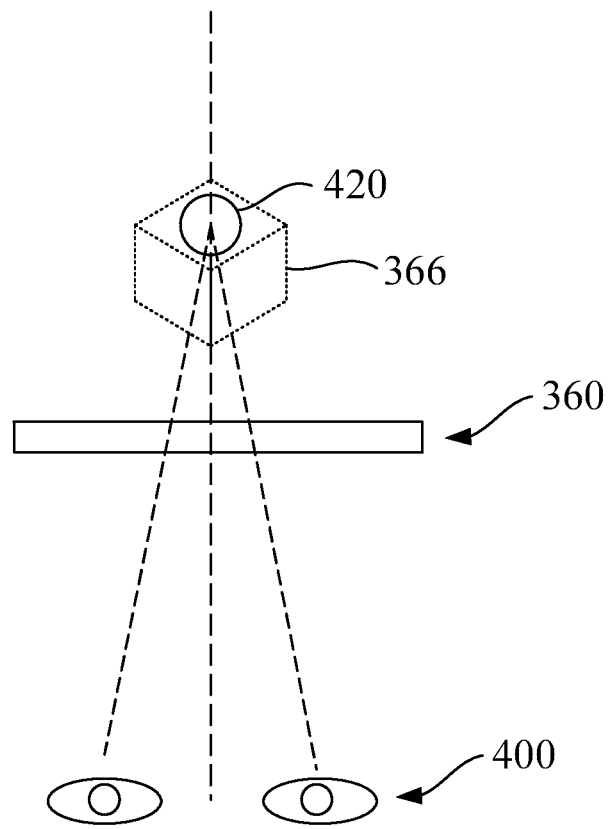
FIG. 5A illustrates a schematic view of computing binocular parallax for the stereoscopic virtual object and generating two sets of images respectively corresponding to the left eye and right eye of the user according to an embodiment of the invention.
Figure 5B:
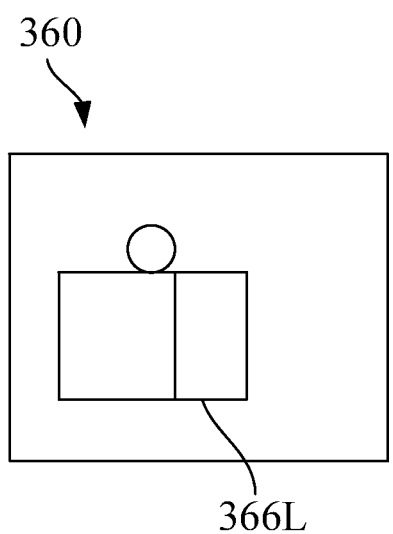
FIG. 5B illustrates a schematic view of the left-eye image shown in FIG. 5A.
Figure 5C:
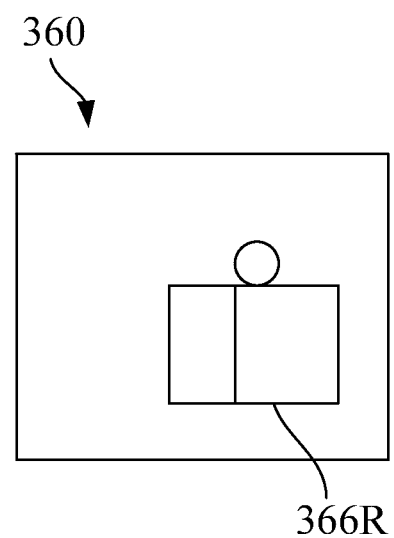
FIG. 5C illustrates a schematic view of the right-eye image shown in FIG. 5A.

Referring to FIGS. 5A, 5B and 5C, they illustrate schematic views of computing binocular parallax for the stereoscopic virtual object and generating two sets of images respectively corresponding to the left eye and right eye of the user according to an embodiment of the invention. In FIG. 5, it illustrates that when two eyes of the user are disposed at different positions in the observation area 400, the perspectives of observing the real object 420 and the stereoscopic virtual object 366 through the two eyes may be different (i.e., the binocular parallax). Therefore after the computing module 340 generates the position coordinate of the stereoscopic virtual object 366 according to the relative position relationship, the driving module 380 can further generate a left-eye image 366L shown in FIG. 5B and a right-eye image 366R shown in FIG. 5C according to the binocular parallax, so as to display the stereoscopic virtual object 366 on the transparent displaying apparatus 362. FIGS. 5A-5C illustrates schematic views with large binocular parallax, but the invention is not limited to this and in the actual application the two sets of images considering the binocular parallax mostly only have a small distance therebetween.

The stereoscopic displaying method can transmit the images to the left and right eyes of the user through timing separation, optical polarization separation or other different stereoscopic displaying techniques, which is well known to those of skills in the art and will not be described herein anymore. In this embodiment, the driving module 380 transmits a plurality of image frames corresponding respectively to the left-eye images and the right-eye images to the transparent displaying apparatus 362 in time sequences, so as to achieve a stereoscopic image effect, but the invention is not limited to this.

It should be further illustrated that, in the picture (as shown in FIGS. 4B, 4D, 4F and 4H) displayed by the stereoscopic displaying module 360, a certain depth-of-field order may exist between the stereoscopic virtual object 366 and the real object 420. When the stereoscopic virtual object 366 and the real object 420 are partially overlapped, one of them adjacent to the observation area 400 should obscure over the other according to the depth-of-field order, so as to achieve a vivid stereoscopic depth-of-field effect.

Therefore, the stereoscopic displaying module 360 of the entertainment displaying system 300 is provided with an optical-shielding structure 364. The optical-shielding structure 364 is disposed adjacent to the transparent displaying apparatus 362 and located between the transparent displaying apparatus 362 and the real object 420. The shielding configuration of the optical-shielding structure 364 is switched according to a virtual depth-of-field order between the stereoscopic virtual object 366 and the real object 420.

Figure 6A:
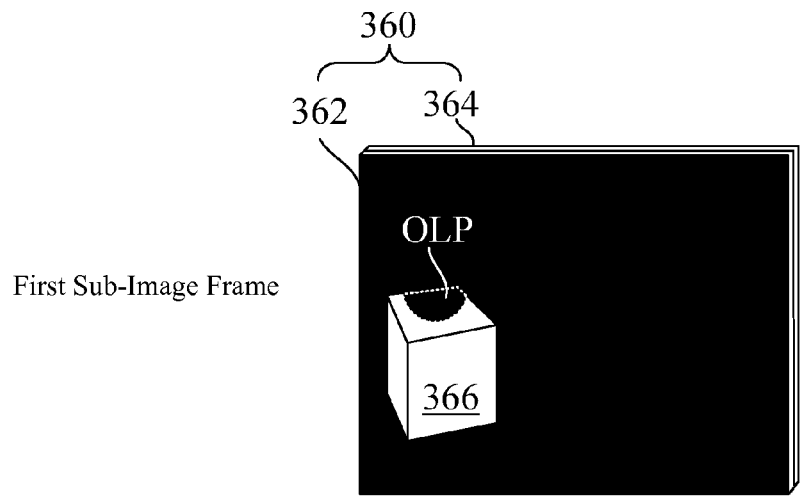
FIGS. 6A-6C illustrate schematic views according to an embodiment when the stereoscopic virtual object and the real object are partially overlapped.
Figure 6B:
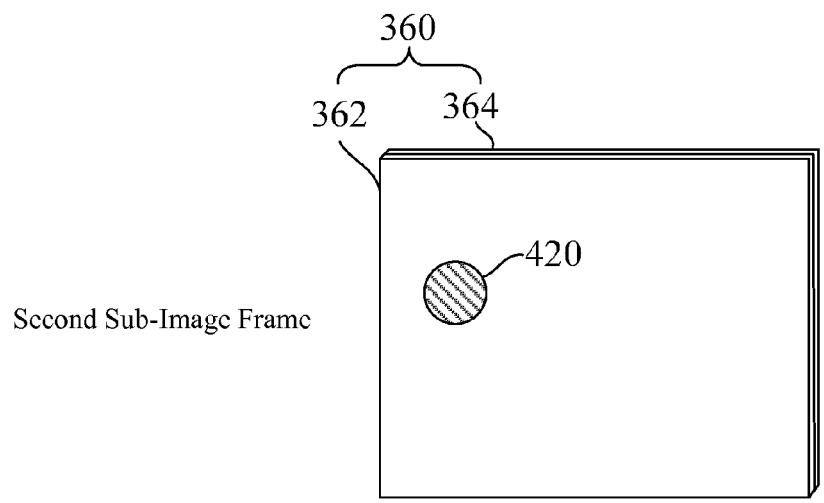
Figure 6C:
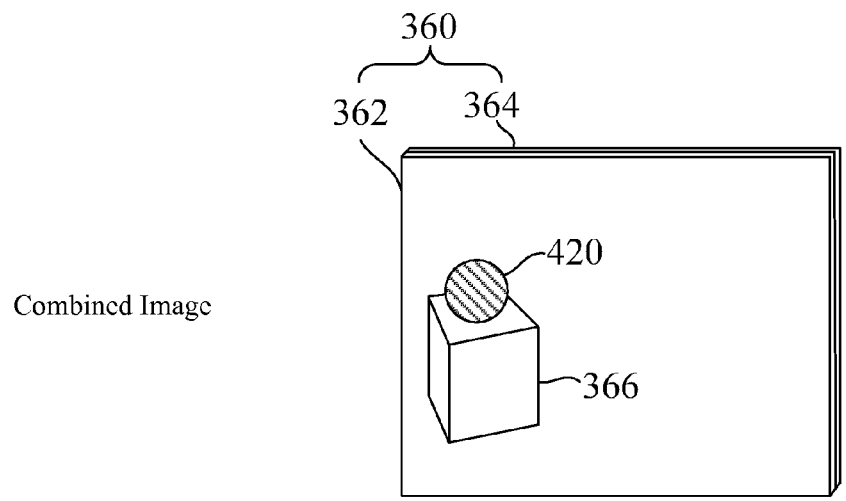

Referring to FIGS. 6A-6C, they illustrate schematic views according to an embodiment when the stereoscopic virtual object 366 and the real object 420 are partially overlapped. FIGS. 6A and 6B respectively illustrate the shielding configuration of the optical-shielding structure 364 under two sub-image frames (a first sub-image frame and a second sub-image frame) of this embodiment. FIG. 6C illustrates a schematic view of a combined image of the aforesaid sub-image frames caused by duration of vision.

In the embodiments of FIGS. 6A-6C, the stereoscopic virtual object 366 and the real object 420 are partially overlapped from the perspective of the observation area 400, and for the order of depth-of-field between them in the overlapping portion OLP the real object 420 is closer to the observation area 400 (foreground) while the stereoscopic virtual object 366 is far from the observation area 400 (background).

In one of the sub-image frames (such as the first sub-image frame shown in FIG. 6A), the optical-shielding structure 364 is completely activated to perform optical-shielding and a non-overlapping portion of the stereoscopic virtual object 366 overlapping portion is displayed by the transparent displaying apparatus 362 (i.e. displaying the stereoscopic virtual object 366 other than the overlapping portion OLP with the real object 420). As such, the optical-shielding structure 364 blocks the light and image from the background; only the non-overlapping portion of the stereoscopic virtual object 366, which is not overlapped with the real object 420, is displayed by the transparent displaying apparatus 362; and the overlapping portion OLP of the stereoscopic virtual object 366 is blocked, such that the stereoscopic virtual object 366 is viewed as the background. In this embodiment, the transparent displaying apparatus 362 may be a displaying apparatus with a displaying panel having luminousness substantially greater than 80%, such as an active-lightening to displaying apparatus. Alternatively the transparent displaying apparatus 362 includes a side-type backlight source (not shown). Therefore, the transparent displaying apparatus 362 can display the stereoscopic virtual object 366 without a background light source. The optical-shielding structure 364 for example may be a displaying apparatus with a displaying panel having luminousness substantially greater than 80%, such as a partially activated active-lightening displaying, and thus the optical-shielding structure 364 displays partial transparent and partial non-transparent on the displaying panel through the partially activating function to enable the light of the real object 420 to pass through the optical-shielding structure 364.

In the other sub-image frame (the second sub-image frame of FIG. 6B), the optical-shielding structure 364 does not activate optical-shielding and the transparent displaying apparatus 362 is switched into a transparent state, so that the user can observe the real object 420 directly. Therefore, at the overlapping portion OLP the stereoscopic virtual object 366 is blocked and the real object 420 covers over the stereoscopic virtual object 366, such that the effect that the stereoscopic virtual object 366 is used as the background and the real object 420 is used as the foreground is achieved. As such, the combined image effect of the two sub-image frames caused by duration of vision is as shown in FIG. 6C.

Figure 7A:
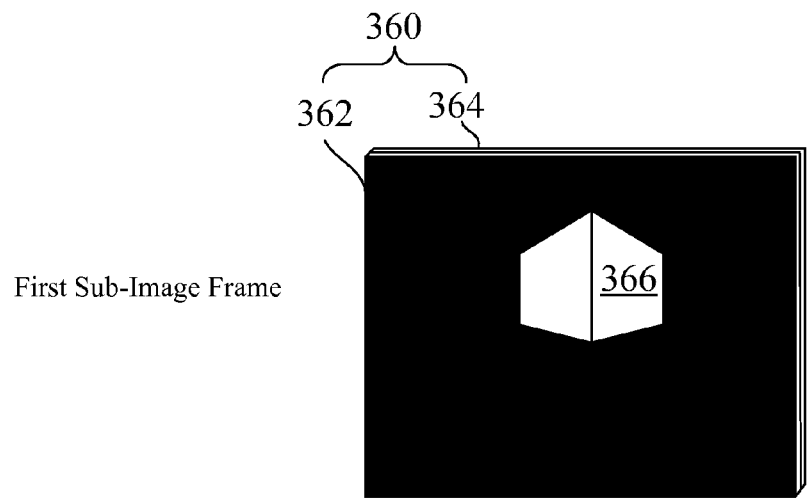
FIGS. 7A-7C illustrate schematic views according to another embodiment when the stereoscopic virtual object and the real object are partially overlapped.
Figure 7B:
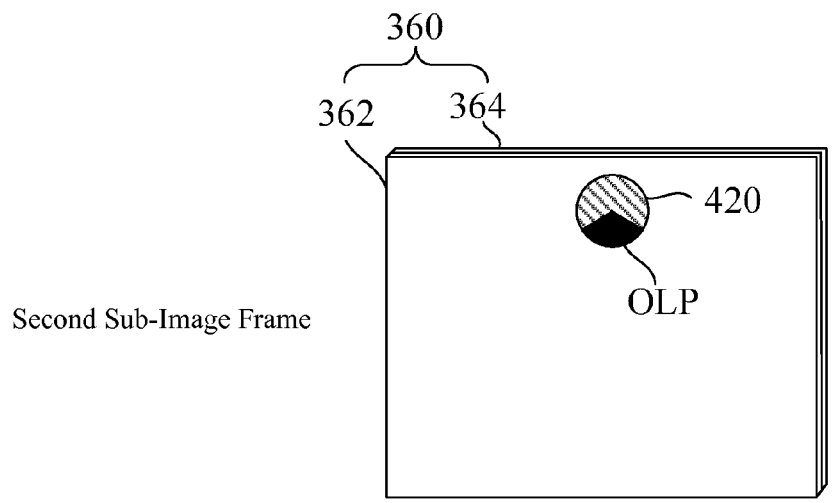
Figure 7C:
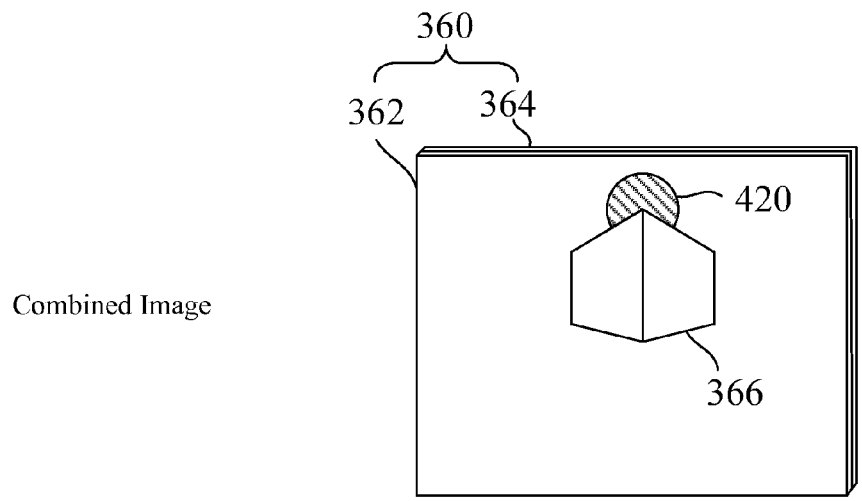

Referring to FIGS. 7A-6C, they illustrate schematic views according to another embodiment when the stereoscopic virtual object 366 and the real object 420 partially overlap. FIGS. 7A and 7B respectively illustrate the shielding configuration of the optical-shielding structure 364 under two sub-image frames (the first sub-image frame and the second sub-image frame) of this embodiment. FIG. 7C illustrates a schematic view of a combined image of the aforesaid sub-image frames caused by duration of vision.

In the embodiments of FIGS. 7A-7C, the stereoscopic virtual object 366 and the real object 420 partially overlap from the perspective of the observation area 400, and the stereoscopic virtual object 366 is closer to the observation area 400 (foreground) while the real object 420 is far from the observation area 400 (background) in the depth-of-field order with respect to the overlapping portion (OLP).

In one of the sub-image frames (such as the first sub-image frame shown in FIG. 7A), the optical-shielding structure 364 is completely activated to perform optical-shielding and displays the stereoscopic virtual object 366 by the transparent displaying apparatus 362. As such, the optical-shielding structure 364 blocks the light and image from the background; the stereoscopic virtual object 366 is only displayed by the transparent displaying apparatus 362; and at the overlapping portion OLP the stereoscopic virtual object 366 is displayed while the real object 420 is removed, so as to achieve the effect that the stereoscopic virtual object 366 is used as the foreground. In this embodiment, the transparent displaying apparatus 362 may be an active-lightning displaying apparatus, or alternatively the transparent displaying apparatus 362 includes a side-type backlight source (not shown). Therefore, the transparent displaying apparatus 362 can display the stereoscopic virtual object 366 without the background light source.

In the other sub-image frame (the second sub-image frame of FIG. 7B), the optical-shielding structure 364 is activated to perform the optical-shielding only at the overlapping portion OLP of the stereoscopic virtual object 366 and the real object 420 while the transparent displaying apparatus 362 is switched to transparent, so that the user can observe the real object 420 directly. As such, the combined image effect of the two sub-image frames generated due to duration of vision is as shown in FIG. 7C.

Additionally, in the embodiments of FIGS. 7A-7C, since in the first sub-image frame the optical-shielding structure 364 is completely activated to perform the optical-shielding, and in the second sub-image frame the overlapping portion OLP of the stereoscopic virtual object 366 and the real object 420 is also overlapped, the display brightness at the overlapping portion OLP is poor, which is inconsistent with other non-overlapped part of the stereoscopic virtual object 366. Therefore, the entertainment displaying system 300 of the invention can further perform brightness compensation to the overlapping portion OLP of the stereoscopic virtual object 366 and the real object 420.

Figure 8A:
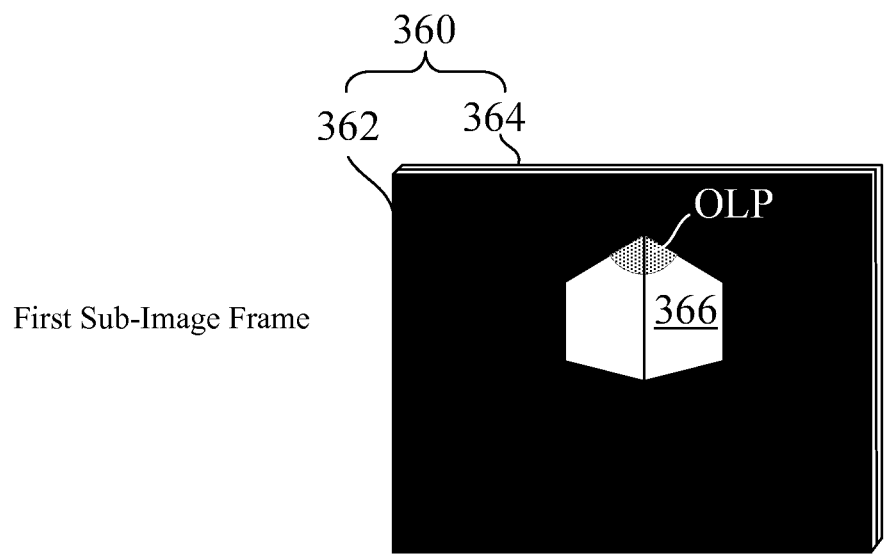
FIGS. 8A and 8B illustrate a brightness compensation mechanism according to an embodiment of the invention.
Figure 8B:
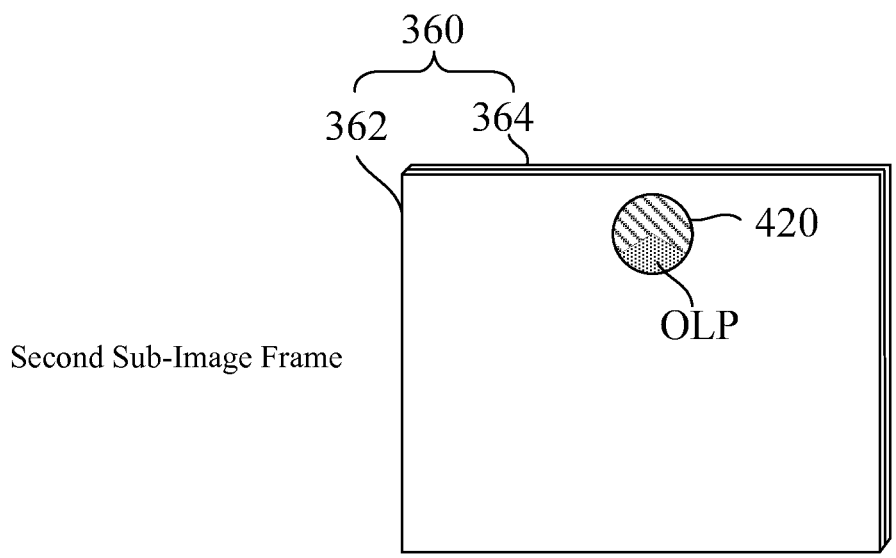

For example, the brightness of the transparent displaying apparatus 362 is adjusted with respect to the sub-image frames so as to perform the brightness compensation to the overlapping portion OLP. FIGS. 8A and 8B illustrate a brightness compensation mechanism according to an embodiment of the invention. As shown in FIG. 8A, during activated time period of the first sub-image frame, the optical-shielding structure 364 is completely activated to perform the optical-shielding and displays the stereoscopic virtual object 366 by the transparent displaying apparatus 362. The display brightness of the transparent displaying apparatus 362 at areas where the stereoscopic virtual object 366 and the real object 420 are not overlapped is set as 100%, and the display brightness of the transparent displaying apparatus 362 at the overlapping portion OLP is set as 50%. As shown in FIG. 8B, in the second sub-image frame, the overlapping portion OLP is not optical-shielded, and the transparent displaying apparatus 362 is set as continuously displaying the overlapping portion of the stereoscopic virtual object 366 with a display brightness of 50% at the overlapping portion OLP. As such, the overlapping portion of the stereoscopic virtual object 366 is displayed by the transparent displaying apparatus 362 with an even brightness (a display brightness of 50%) respectively in the first sub-image frame and second sub-image frame, so as to perform brightness compensation to the overlapping portion OLP. Therefore, in the first sub-image frame the optical-shielding is activated while in the second sub-image frame the optical-shielding is not activated. Furthermore, the non-overlapping portion of the stereoscopic virtual object 366 has a display brightness of 100% during the time period of the first sub-image frame; and the overlapping portion OLP of the stereoscopic virtual object 366 has a display brightness of 50% during the time period of an image frame (i.e., the first sub-image frame and second sub-image frame), so as to complete the brightness compensation and avoid uneven brightness. Moreover, blank frames (i.e., not involving practical image information) may be further inserted between each twos of the image frames. The transparent displaying apparatus 362 displays a black screen in the blank frames to avoid interference between frames, but this embodiment is not limited to this.

Figure 9A:
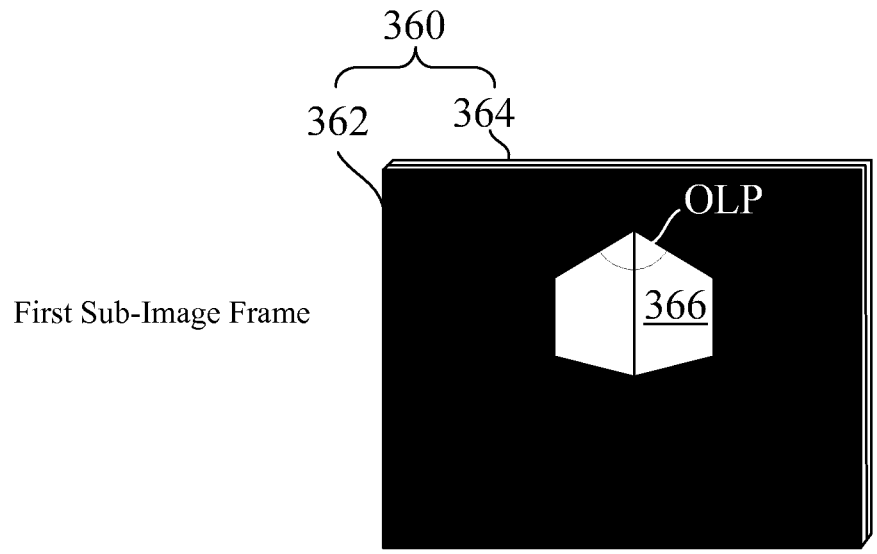
FIGS. 9A and 9B illustrate another brightness compensation mechanism according to an embodiment of the invention.
Figure 9B:
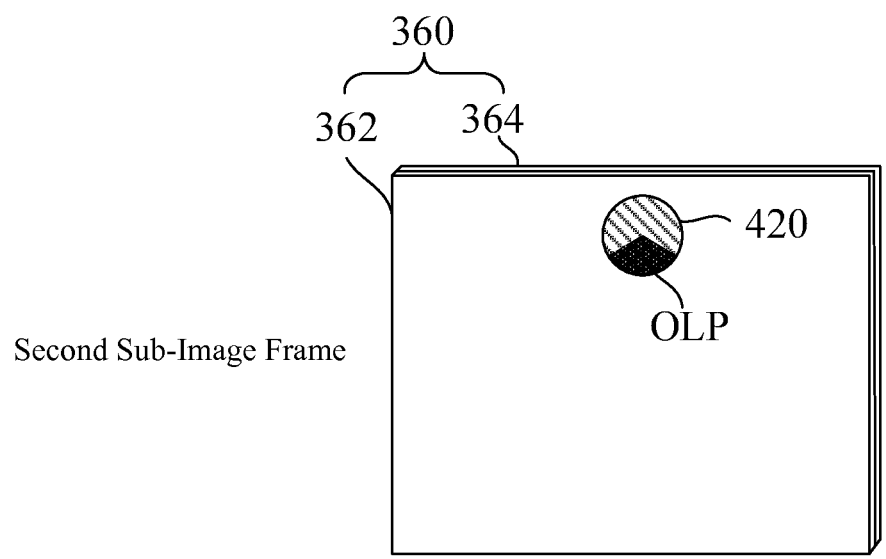

FIGS. 9A and 9B illustrate another brightness compensation mechanism according to an embodiment of the invention. As shown in FIG. 9A, during activated time period of the first sub-image frame, the optical-shielding structure 364 is completely activated to perform the optical-shielding and displays the stereoscopic virtual object 366 by the transparent displaying apparatus 362. The display brightness of the transparent displaying apparatus 362 at areas where the stereoscopic virtual object 366 and the real object 420 are not overlapped is set as 100%, and the display brightness of the transparent displaying apparatus 362 at the overlapping portion OLP is set as 200%. As shown in FIG. 9B, in the second sub-image frame the overlapping portion OLP is optical-shielded. That is, in the first sub-image frame the optical-shielding structure is activated completely to perform optical-shielding, and the overlapping portion of the stereoscopic virtual object 362 is displayed by the transparent displaying apparatus 362 with an increased brightness (the display brightness of 200%). As such, the brightness compensation can also be completed to avoid the phenomenon of uneven brightness.

Figure 10:
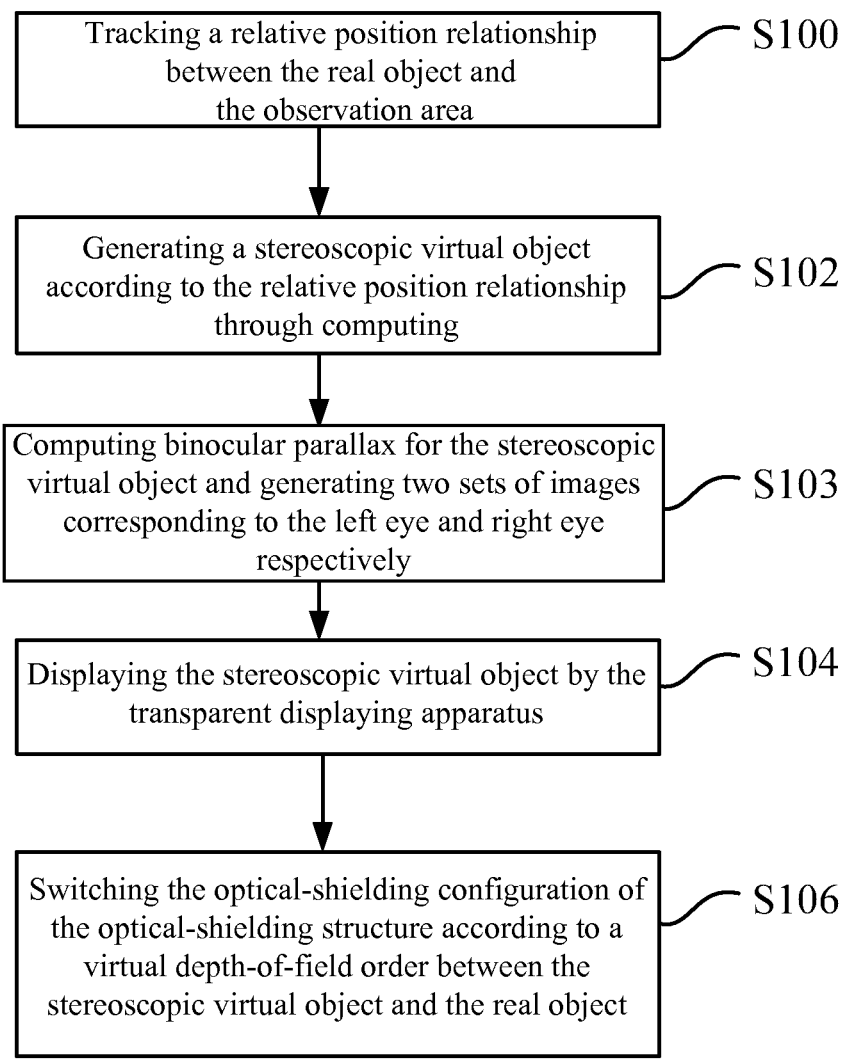
FIG. 10 illustrates a flow chart of an interactive stereoscopic displaying method according to another embodiment of the invention.

Additionally, referring to FIG. 10, it illustrates a flow chart of an interactive stereoscopic displaying method according to another embodiment of the invention. The interactive stereoscopic displaying method generates an interactive displaying effect to the observation area according to the real object. A transparent displaying apparatus and an optical-shielding structure are disposed between the real object and the observation area. The above-mentioned objects and structures can be known by referring to the foregoing embodiments and drawing illustration, which will not be described here anymore.

As shown in FIG. 10, for the interactive stereoscopic displaying method first the step S100 is performed, tracking the position coordinates of the observation area and the real object and generating a relative position relationship between the observation area and the real object. The relative position relationship includes a first relative angle included by the real object relative to the observation area along a first directional axis when the observation area is used as the reference point, a second relative angle included by the real object relative to the observation area along a second directional axis which is perpendicular to the first directional axis, and a relative horizontal distance from the real object to the observation area (referring to FIGS. 4A-4F).

Subsequently, the step S102 is performed, generating at least one stereoscopic virtual object according to the relative position relationship. The step S102 of generating at least one stereoscopic virtual object can further regulate a stereoscopic visual effect of an object prototype according to the first relative angle and the second relative angle, regulate the size of the object prototype according to the relative horizontal distance and generate the stereoscopic virtual object according to the regulating result of the object prototype (referring to FIGS. 4A-4F).

Subsequently, the step S104 is performed, displaying the stereoscopic virtual object by the transparent displaying apparatus. In this step, a plurality of image frames can be generated to the transparent displaying apparatus in time sequences. The image frames correspond respectively to the left-eye image and the right-eye image so as to achieve the stereoscopic visual effect of the stereoscopic virtual object.

Then, the step S106 is performed, switching the optical-shielding configuration of the optical-shielding structure according to a virtual depth-of-field order between the stereoscopic virtual object and the real object (referring to FIGS. 6A-6C and 7A-7C).

Furthermore, after the step S102 is completed and the stereoscopic virtual object is generated, in the interactive stereoscopic displaying method the step S103 is further performed, computing the binocular parallax for the stereoscopic virtual object and generating images respectively corresponding to the left and right eyes (as shown in FIGS. 5A-5C).

Each image frame displayed on the transparent displaying apparatus at least includes two sub-image frames. When the real object is closer to the observation area in the depth-of-field order, the optical-shielding structure is activated to perform complete optical-shielding, and a non-overlapping portion of the stereoscopic virtual object (which is not overlapped with the real object) is displayed by the transparent displaying apparatus in one of the sub-image frames. In another sub-image frame, the optical-shielding structure is switched off, and the transparent displaying apparatus is switched to a transparent state (referring to FIGS. 6A-6C).

If the stereoscopic virtual object is closer to the observation area in the depth-of-field order, the optical-shielding structure is activated to perform complete optical-shielding, and the stereoscopic virtual object is displayed by the transparent displaying apparatus in one of the sub-image frames. In another sub-image frame the optical-shielding structure is activated to perform optical-shielding at the overlapping portion of the stereoscopic virtual object and the real object, and the transparent displaying apparatus is switched to a transparent state (referring to FIGS. 7A-7C).

To avoid low brightness on the overlapping portion and an inconsistence between the overlapping portion and the non-overlapping portion, the interactive stereoscopic displaying method of the invention further performs brightness compensation to the overlapping portion of the stereoscopic virtual object and the real object. For example, for the overlapping portion of the stereoscopic virtual object and the real object, the overlapping portion of the stereoscopic virtual object is displayed by the transparent displaying apparatus respectively in the first sub-image frame and the second sub-image frame with an even brightness (referring to FIGS. 8A-8B and the previous corresponding embodiments). Alternatively, in the first sub-image frame the optical-shielding structure is activated completely to perform optical-shielding, and the overlapping portion of the stereoscopic virtual object is displayed by the transparent displaying apparatus with an increased brightness (referring to FIGS. 9A-9B and the previous corresponding embodiments). The details of the brightness compensation have been described in the foregoing embodiments and will not be described here anymore.

In view of the above, the invention discloses an entertainment displaying system and an interactive stereoscopic displaying method. The entertainment displaying system includes the transparent displaying apparatus disposed between the real object and the observation area, and the entertainment displaying system tracks the relative position relationship between the real object and the observation area to generate a stereoscopic virtual object and display the stereoscopic virtual object by the transparent displaying apparatus, so as to avoid inaccurate alignment caused by position change of the user. Furthermore, an optical-shielding structure disposed adjacent to the transparent to displaying apparatus selectively switch shielding configuration of the optical-shielding structure to simulate an order of depth-of-field between the stereoscopic virtual object and the real object (for example, the stereoscopic virtual object is used as a foreground and the real object is used as the background, or alternatively the real object is used as a foreground and the stereoscopic virtual object is used as the background), so that a virtual position of the stereoscopic virtual object may be disposed before or after the real object, without being limited to the precedence relationship in the actual arrangement.

Although the present invention has been disclosed with reference to the above embodiments, these embodiments are not intended to limit the present invention. It will be apparent to those of skills in the art that various modifications and variations can be made without departing from the spirit and scope of the present invention. Therefore, the scope of the present invention shall be defined by the appended claims.

What is claimed is:

1. An entertainment displaying system for generating interactive displaying effects corresponding to a real object in view of an observation area, comprising:

a tracking module located between the real object and the observation area, for tracking a relative position relationship between the observation area and the real object;

a computing module for computing displaying parameters of at least one to stereoscopic virtual object according to the relative position relationship; and a stereoscopic displaying module disposed between the real object and the observation area, comprising:

a transparent displaying apparatus configured for displaying the at least one stereoscopic virtual object, wherein a displaying plane of the transparent displaying apparatus has a transverse axis and a longitudinal axis, a normal line is defined by virtually linking the observation area and its projection on the displaying plane of the transparent displaying apparatus, a linking line is defined by virtually linking the observation area and the real object, the relative position relationship comprises a first relative angle of the linking line deviated from the normal line toward the transverse axis, a second relative angle of the linking line deviated from the normal line toward the longitudinal axis and a relative horizontal distance between the observation area and the real object along the normal line, the computing module computes a stereoscopic virtual object perspective of an object prototype according to the first relative angle and the second relative angle, and the computing module computes a stereoscopic virtual object size of the object prototype according to the relative horizontal distance; and an optical-shielding structure disposed adjacent to the transparent displaying apparatus and located between the transparent displaying apparatus and the real object, a shielding configuration of the optical-shielding structure is switched according to a virtual depth-of-field order between the stereoscopic virtual object and the real object.

2. The entertainment displaying system of claim 1, further comprising a driving module, wherein the driving module transmits a plurality of image frames to the transparent displaying apparatus in time sequences, and the image frames correspond to images for the left eye and the right eye respectively.

3. The entertainment displaying system of claim 2, wherein each image frame displayed by the transparent displaying apparatus at least comprises two sub-image frames, the optical-shielding structure is activated to perform complete optical-shielding in the first sub-image frame, and the optical-shielding structure is activated to perform partial optical-shielding at the overlapping portion of the stereoscopic virtual object and the real object selectively according to the virtual depth-of-field order between the stereoscopic virtual object and the real object in the second sub-image frame.

4. The entertainment displaying system of claim 3, wherein, when the stereoscopic virtual object and the real object are overlapped and the real object is closer to the observation area in the virtual depth-of-field order, the optical-shielding structure is activated to perform complete optical-shielding and a non-overlapping part of the stereoscopic virtual object is displayed by the transparent displaying apparatus in the first sub-image frame, and the optical-shielding structure deactivates optical-shielding and the transparent displaying apparatus is switched into a transparent state in the second sub-image frame.

5. The entertainment displaying system of claim 3, wherein, when the stereoscopic virtual object and the real object are overlapped and the stereoscopic virtual object is closer to the observation area in the virtual depth-of-field order, the optical-shielding structure is activated to perform complete optical-shielding and the stereoscopic virtual object is displayed by the transparent displaying apparatus in the first sub-image frame, and the optical-shielding structure is activated to perform partial optical-shielding only at an overlapping portion of the stereoscopic virtual object and the real object and the transparent displaying apparatus is switched into a transparent state in the second sub-image frame.

6. The entertainment displaying system of claim 1, wherein the transparent displaying apparatus is an active-lightning displaying apparatus, or the transparent displaying apparatus comprises a light source.

7. An interactive stereoscopic displaying method for generating interactive displaying effects corresponding to a real object in view of an observation area, a transparent displaying apparatus and an optical-shielding structure being disposed between the real object and the observation area, and the interactive stereoscopic displaying method comprises:
   tracking a relative position relationship between the observation area and the real object, wherein a displaying plane of the transparent displaying apparatus has a transverse axis and a longitudinal axis, a normal line is defined by virtually linking the observation area and its projection on the displaying plane of the transparent displaying apparatus, a linking line is defined by virtually linking the observation area and the real object, the relative position relationship comprises a first relative angle of the linking line deviated from the normal line toward the transverse axis, a second relative angle of the linking line deviated from the normal line toward the longitudinal axis and a relative horizontal distance between the observation area and the real object along the normal line;
   computing displaying parameters of at least one stereoscopic virtual object according to the relative position relationship, the step of computing displaying parameters of at least one stereoscopic virtual object further comprising:
      computing a stereoscopic perspective for an object prototype according to the first relative angle and the second relative angle;
      computing a stereoscopic object size of the object prototype according to the relative horizontal distance; and
      obtaining the at least one stereoscopic virtual object according to computing results of the object prototype;
   displaying the stereoscopic virtual object by the transparent displaying apparatus; and
   switching a shielding configuration of the optical-shielding structure according to a virtual depth-of-field order between the stereoscopic virtual object and the real object.

8. The interactive stereoscopic displaying method of claim 7, further comprising:
   generating a plurality of image frames to the transparent displaying apparatus in time sequences, the image frames corresponding to images for the left eye and the right eye respectively.

9. The interactive stereoscopic displaying method of claim 8, wherein each image frame displayed on the transparent displaying apparatus at least comprises two sub-image frames, if the real object is closer to the observation area in the virtual depth-of-field order, the interactive stereoscopic displaying method comprises:
   activating the optical-shielding structure to perform complete optical-shielding and displaying a non-overlapping portion of the stereoscopic virtual object by the transparent displaying apparatus in a first sub-image frame of the sub-image frames; and
   switching off the optical-shielding structure and switching the transparent displaying apparatus into a transparent state in a second sub-image frame of the sub-image frames.

10. The interactive stereoscopic displaying method of claim 8, wherein each image frame displayed on the transparent displaying apparatus at least comprises two sub-image frames, and if the stereoscopic virtual object is closer to the observation area in the virtual depth-of-field order, the interactive stereoscopic displaying method comprises:
   activating the optical-shielding structure completely to perform optical-shielding, and displaying the stereoscopic virtual object by the transparent displaying apparatus in the first sub-image frame; and
   activating the optical-shielding structure to perform partial optical-shielding at an overlapping portion of the stereoscopic virtual object and the real object, and switching the transparent displaying apparatus into a transparent state in the second sub-image frame.

11. The interactive stereoscopic displaying method of claim 9, wherein, when the stereoscopic virtual object overlaps the real object, the interactive stereoscopic displaying method performs brightness compensation at the overlapping portion of the stereoscopic virtual object and the real object.

12. The interactive stereoscopic displaying method of claim 11, further comprising:
   displaying the overlapping portion of the stereoscopic virtual object by the transparent displaying apparatus with an even brightness respectively in the first sub-image frame and the second sub-image frame in respect to the overlapping portion of the stereoscopic virtual object and the real object.

13. The interactive stereoscopic displaying method of claim 11, further comprising:
   displaying the overlapping portion of the stereoscopic virtual object by the transparent displaying apparatus with an increased brightness in the first to sub-image frame.

14. The interactive stereoscopic displaying method of claim 13, further comprising:
   displaying a black screen by the transparent displaying apparatus during blank frames inserted between each twos of the image frames.

15. The interactive stereoscopic displaying method of claim 10, wherein, when the stereoscopic virtual object overlaps the real object, the interactive stereoscopic displaying method performs brightness compensation at the overlapping portion of the stereoscopic virtual object and the real object.

16. The interactive stereoscopic displaying method of claim 15, further comprising:
   displaying the overlapping portion of the stereoscopic virtual object by the transparent displaying apparatus with an even brightness respectively in the first sub-image frame and the second sub-image frame in respect to the overlapping portion of the stereoscopic virtual object and the real object.

17. The interactive stereoscopic displaying method of claim 15, further comprising:
    displaying the overlapping portion of the stereoscopic virtual object by the transparent displaying apparatus with an increased brightness in the first sub-image frame.

18. The interactive stereoscopic displaying method of claim 17, further comprising:
    displaying a black screen by the transparent displaying apparatus during blank frames inserted between each twos of the image frames.

* * * * *